United States Patent [19]
Dicke

[11] Patent Number: 5,897,280
[45] Date of Patent: Apr. 27, 1999

[54] SELF PERFORATING AND THREAD FORMING CONNECTING ELEMENT

[75] Inventor: Robert Dicke, Ennepetal, Germany

[73] Assignee: A-Z Ausrustung und Zubehor GmbH & Co. KG, Germany

[21] Appl. No.: 09/054,645

[22] Filed: Apr. 3, 1998

[30] Foreign Application Priority Data

Apr. 3, 1997 [DE] Germany ............... 297 05 916 U

[51] Int. Cl.⁶ .................. F16B 25/00; F16B 35/04
[52] U.S. Cl. .................. 411/411; 411/386; 411/426
[58] Field of Search .................. 411/386, 387, 411/411, 416, 418, 426

[56] References Cited

U.S. PATENT DOCUMENTS

| | | | |
|---|---|---|---|
| 3,180,126 | 4/1965 | Carlson | 411/416 X |
| 3,246,556 | 4/1966 | Phipard, Jr. | 411/416 |
| 4,194,430 | 3/1980 | Muenchinger | 411/387 X |

Primary Examiner—Neill Wilson
Attorney, Agent, or Firm—Harness, Dickey & Pierce, P.L.C.

[57] ABSTRACT

A self perforating (punching) and thread forming connecting element such as a screw having a screw shaft 2 and screw tip 6 which tapers to a pointed end 4 as well as a single or multiple thread 8 which extends at least partially along the screw shaft 2 and along the screw tip 6 to the pointed end 4. This screw tip 6 has an essentially polygonal cross section along at least a partial region of its axial length and the thread 8 is constructed as a radially raised portion which has a helical shape with an outer thread edge 8a which, when viewed in an axial projection, forms a spiral in the region of the screw tip 6 as the radius of the thread becomes smaller and in the region of the screw shaft 2, the outer thread edge 8a proceeds with a constant radius in the form of a circle.

12 Claims, 1 Drawing Sheet

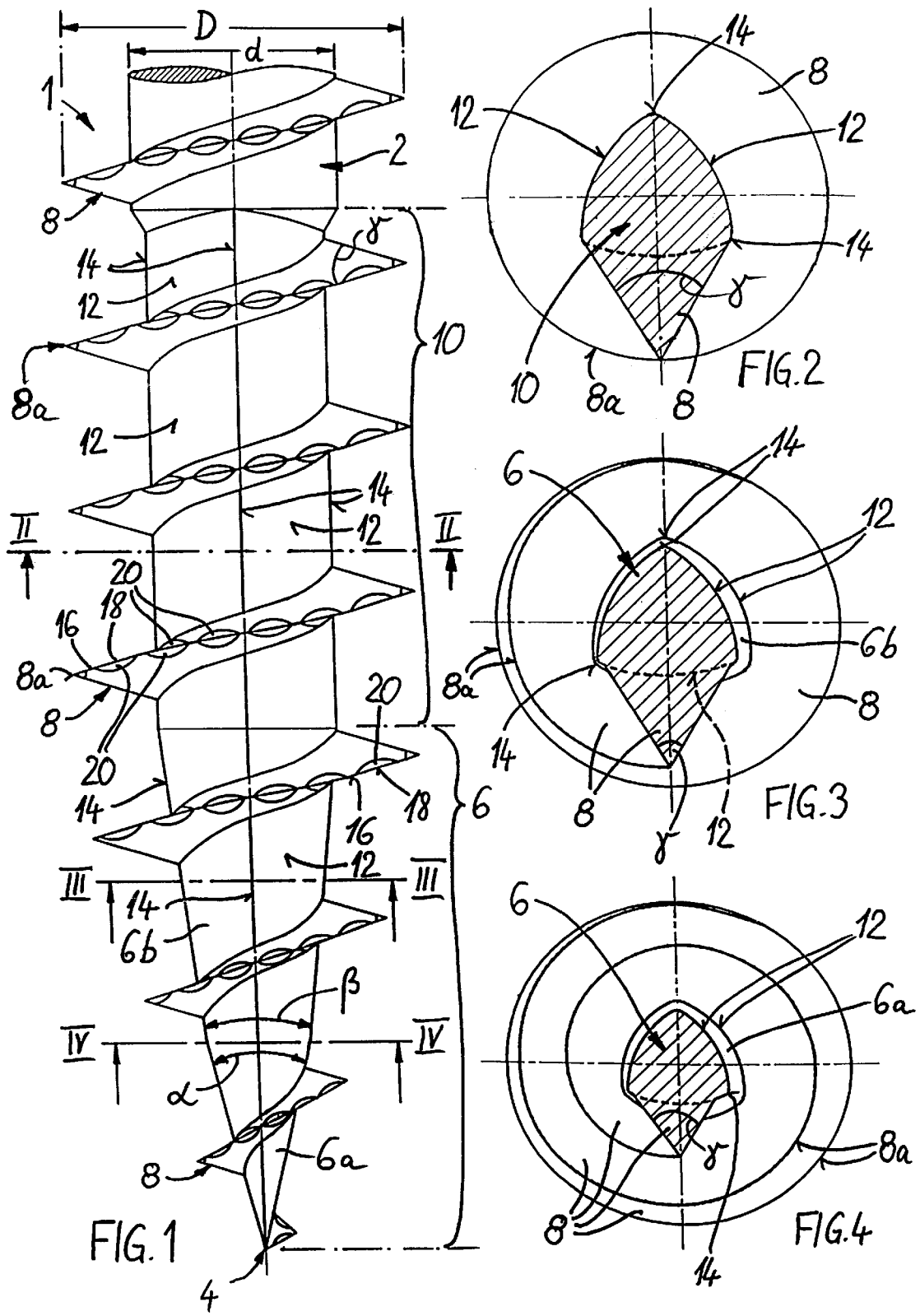

SELF PERFORATING AND THREAD FORMING CONNECTING ELEMENT

BACKGROUND AND SUMMARY OF THE INVENTION

The present invention concerns a self-perforating (punching) and thread-forming connecting element, in particular a screw, with a screw shaft and screw tip, which tapers to a sharp point, as well as a single or multiple thread, which runs at least partly along the screw shaft and the tip of the screw up to the pointed end.

Such a connecting element is known from the DE 33 35 092 A1. These types of connecting elements, in particular screws, have the function of being screwed directly into soft materials, such as, above all, wood materials of all kinds, and specifically without requiring any prior drilling of a core hole. The screw is thus screwed directly into the material, during which process a material-displacement effect without the generation of chips is achieved. The screw, including the tip of the screw, is then seated in the material, so that the entire thread up to the tip participates in the retaining function and, therefore, high loosening moments and pull-out forces or moments can be achieved. In this case, the known screw, by virtue of a wave-shaped design of the edge of the thread, has a reduced screw-in moment, while the tip of the thread acts as a kind of rubbing tool due to the fact that the thread terminates in a pointed end. This screw has proved itself very well in practical use.

The DE 195 32 874 A1 describes a very similar connecting element, where additionally in the region of the tip at least one rubbing edge portion extends in the longitudinal direction of the screw along a part of the length of the tip of the screw. The rubbing region has a slight cutting effect.

The U.S. Pat. No. 3,246,556 describes a thread-forming, but not self-perforating screw for thin sheet metal materials, i.e. for threading a screw into a previously drilled core hole (pilot hole). For this purpose, this known screw consists of two sections with basically different designs and functions, and more specifically of a thread-forming section at the end or the tip and a retaining section following it. The retaining section consists of a cylindrical shaft with a circular and helical thread. The thread-forming section, on the other hand, has a cross-section, which consists of an equilateral triangle, while, in this region, the outer edge of the thread also has a corresponding triangular shape. The thread-forming section has the exclusive function of forming a thread in a pre-drilled core hole of a thin sheet metal material at a relatively low screw-in moment and without generating chips, in which hole subsequently only a portion of the thread of the retaining section is seated. The thread-forming section thus does not contribute to the retaining function, but the loosening and pull-out moment is exclusively determined by the retaining section.

The present invention is based on the task of creating a connecting element of the generic type, which is especially well suited for screwing it directly into soft materials, such as, for example, wood, plywood, composite materials and the like without requiring pre-drilling, and where a small tightening moment and a high loosening and pull-out moment is achieved.

According to the invention this is achieved by means of screw tips which, at least in a partial region of their axial length, have an essentially polygonal cross-section, while the thread is constructed as a helix-shaped raised portion with an outer edge of the thread, and where the edge of the thread—viewed in an axial projection—proceeds along the region of the screw tip in the form of a spiral as the radius becomes smaller, and in a circular form and with a constant radius in the region of the shaft of the screw. As far as the polygonal cross-section is concerned, it consists of a triangular, quadrangular or pentagonal cross-section, which in a preferred embodiment, contains in particular side surfaces having a convex curvature and/or, under certain circumstances, rounded corners. In this case, it is useful if the region having the essentially polygonal cross-section extends at least to the pointed end of the tip of the thread, and specifically with a surface area approaching zero at the tip.

By means of the design according to the invention, a generation of chips is practically avoided when the screw is screwed into position. Rather, the self-perforating effect of the connecting element according to the invention is based on the fact that the tip of the thread pushes itself into the material by virtue of its polygon-shaped core cross-section, and does so by means of achieving a good radial displacement effect due to the rising and falling moments occurring during the rotation. Yet, a high loosening moment (high retaining force) is achieved, because after the screw is screwed into position, the displaced soft material practically clings to the polygonal cross-section, so that in essence a form-fit or at least a press-fit is achieved. As a result of the fact that the edge of the thread proceeds in a continuous circular or spiral form, a very high pull-out moment or pull-out force is also ensured when the screw has been screwed into position because it, as well as the tip of the screw, is now seated in the material. This means that the connecting element according to the invention has practically only a retaining section, because the tip of the thread also participates in the retaining function, while nevertheless an advantageously low screw-in moment is ensured by virtue of the special design of the tip of the thread.

Further advantageous characteristics of the embodiment of the invention are contained in the dependent claims as well as in the description below.

BRIEF DESCRIPTION OF THE DRAWINGS

On the basis of the example of a preferred embodiment of the invention shown in the drawing the invention will be explained in more detail below. The following is shown:

FIG. 1 is a greatly enlarged side view of the portion of the tip of a connecting element according to the invention, FIG. 2 is a cross-section in the plane II—II according to FIG. 1;

FIG. 3 is a cross-section in the plane III—III according to FIG. 1; and

FIG. 4 is a cross-section in the plane IV—IV according to FIG. 1.

DETAILED DESCRIPTION OF THE PREFERRED EMBODIMENT

The connecting element of the invention can be constructed as a screw 1 shown in FIG. 1 with a screw shaft 2, and a screw tip 6, which has a cross-section which tapers off to a point end 4, as well as a screw head, which is not shown in FIG. 1, which may consist of a slotted head or a Phillips head or the like in order to allow a screw driver to engage it. A single or multiple thread 8 extends over at least a portion of the screw shaft 2 as well as along the tip of the screw 6 up to the end of the point 4. In the example of the embodiment shown, a single thread is illustrated, which is constructed as a raised portion of the shaft 2 and the tip 6, which has the shape of a helix. The screw shaft 2 has essentially a cylindrical shape, i.e. it has a core diameter which is essentially constant along its length. The tip 6 can be located directly adjacent to the shaft 2; however, in the preferred example of an embodiment of the invention shown, there is a transition section 10 interposed axially between the screw shaft 2 and the tip of the screw 6, which preferably has a cross-section which is constant along its length.

According to the invention, it is now contemplated, that the screw tip 6 should have an essentially polygonal cross-section of the core along at least a partial region of its axial length. According to FIGS. 3 and 4, this cross-section consists preferably of an essentially triangular cross-section with side surfaces 12 and corners 14, where preferably at least the side surfaces 12 have a convex curvature. It would be useful to round off the corners 14 slightly. As shown, the cross-section in particular has the basic form of an equilateral (regular) triangle. Alternatively to this, however, almost any polygonal forms at all are within the scope of the invention, for example quadrangles or pentagons.

In the preferred example of the embodiment, the screw tip 6 has an overall length of about 3 to 4, but especially 3½, threads (lead of the thread). In this case it would be advantageous, if the screw tip 6 consisted of two sections 6a and 6b with different tip angles α and β. Preferably, under these circumstances, the tip angle α of the end section 6a, which includes the tip end 4, is greater than the tip angle β of the adjacent tip section 6b. In this case, the overall length of the screw tip 6 is preferably divided in such a manner, that the end section 6a has a length of about 1½ threads, and the adjacent tip section 6b has a length of about 2 threads.

As far as the already mentioned, preferred transition section 10 is concerned, its cross-section corresponds preferably to the cross-section of the region of the screw tip 6, which is adjacent to the transition section 6; see FIG. 2. The length of the transition section 10 corresponds preferably to about three complete threads. The cross-section of the transition section 10 with its polygon corners 14 usefully defines an enveloping circle (not shown), the diameter of which is equal to or slightly smaller than the diameter of the cylindrical screw shaft 2.

The thread 8, which consists of a raised portion, which is shaped like a helix, and which has a pointed, approximately triangular cross-section, has an outer thread edge 8a, which, according to the invention, has in principle a circular form— therefore not analogous to the polygonal cross-section of the core—and which, in the region of the screw tip 6, continues in the form of a spiral with a declining radius due to the tip angles α and β (see FIGS. 3 and 4). In the region of the screw shaft 2 and, under certain conditions, that of the transition section 10, the outer edge 8a of the thread proceeds with a constant radius due to the essentially constant cross-sections, and, therefore, when viewed in the axial projection it has a circular shape (FIG. 2).

In the preferred embodiment of the invention shown in FIG. 1, the thread edge 8a of the thread 8, at least in the region of the screw tip 6—but preferably also in a partial section of the shaft 2, which is adjacent to the screw tip 6 and consists of, in particular, at least one to two full threads—is wave-shaped in such a manner, that a succession of wave peaks 16 and wave valleys 18 (when viewed in a radial direction) is present. Preferably, in the region of the wave valleys 18 in the area of the flanks of the thread 8, axial recesses 20 have been formed, and specifically at one flank or—as is shown—on both flanks of the thread 8. This embodiment—which is known as such—is only shown in FIG. 1, but not in FIGS. 2 to 4.

It is further advantageous, if the thread 8 is designed with regard to its radial height as it relates to each of the cross-sections in such a manner, that between the core cross-section d and the related outer diameter D of the thread 8 there is always a relationship of d=about 0.6 D. In contrast to this, for the typical wood and sheet metal screws, as a rule, the relationship d=0.7 D is applicable. Finally, the thread 8 according to the invention also has a special thread profile, with a flank angle γ in the range of from 30° to 40°, but especially of about 35°, while the usual standard screws have a flank angle of 60°. It should be noted that in the FIGS. 2 to 4, the flank angle γ is always shown somewhat too large, because the thread profile is actually cut obliquely with respect to the helical shape of the thread 8.

The invention is not limited to the examples of the embodiment shown and described, but it also includes all embodiments, which function in the same manner within the spirit of the invention. Furthermore, the invention is thus far also not yet limited to the combination of characteristics defined in claim 1, but it can also be defined by any other arbitrary combination of certain characteristics of all the individual characteristics disclosed as a whole. This means that in principle practically every individual characteristic of claim 1 can be omitted or be replaced by at least one individual characteristic, which was disclosed in another part of the application. In this regard, claim 1 is merely to be understood as a first attempt at the formulation of an invention.

I claim:

1. A self-perforating and thread-forming connecting element (1) comprising a screw shaft (2) and a screw tip (6), which tapers to a pointed end (4), as well as a thread (8), which is extended at least partly along the screw shaft (2) and along the screw tip (6) up to the pointed end (4), the screw tip (6) having an essentially polygonal cross-section along at least a partial region of its axial length, and where the thread (8) is constructed as a radially raised portion, which has a helical shape, with an outer thread edge (8a), where the edge (8a) of the thread, when viewed in an axial projection, forms a spiral in the region of the screw tip (6) as the radius of the outer thread edge continuously decreases, and in the region of the screw shaft (2) the outer thread edge (8a) proceeds with a constant radius and in the form of a circle.

2. The connecting element according to claim 1 characterized in that the polygonal cross-section of the screw tip (6) has side surfaces (12) with a convex curvature.

3. The connecting element according to claim 1 characterized in that the polygonal cross-section of the screw tip (6) has side surfaces (12) and rounded corners (14).

4. The connecting element according to claim 1 characterized in that the polygonal cross-section of the screw tip (6) extends to the tip end (4) and has an area, the size of which approaches zero at the tip end (4).

5. The connecting element according to claim 1 characterized in that the screw tip (6) consists of two axially extending sections (6a, 6b) with different tip angles (α, β) where the tip angle (α) of the end section 6a, which includes the tip end (4), is larger than the tip angle (β) of the adjacent tip section (6b).

6. The connecting element according to claim 1 characterized in that the screw shaft (2) is essentially cylindrical and between the screw shaft (2) and the screw tip (6) a transition section (10) is provided having a cross-section, which is essentially constant along its axial length, and which corresponds to the essentially polygonal cross-section in the adjacent region of the screw tip (6).

7. The connecting element according to claim 6 characterized in that the cross-section of the transition section (10) with its polygon corners (14) defines an envelope circle, the diameter of which is less than or equal to the diameter of a cylindrical screw shaft (2).

8. The connecting element according to claim 6 characterized in that the outer thread edge (8a) of the thread (8) proceeds with a constant radius in the region of the transition section (10), when viewed in an axial projection, and has a circular shape.

9. The connecting element according to claim 1 characterized in that the thread edge (8a) of the thread (8) is formed at least in the region of the screw tip (6) with at least one complete thread having the shape of waves in such a manner that a succession of wave peaks (16) and wave valleys (18) is present, while in the region of the wave valleys (18), recesses (20) are present in the area of the flanks.

10. The connecting element according to claim 1 characterized in that the thread (8) has a flank angle ($\gamma$) in the range of from 30° to 40°.

11. The connecting element according to claim 1 characterized in that the thread (8) has a flank angle ($\gamma$) of about 35°.

12. The connecting element according to claim 1 characterized in that between each of the core cross-sections (d) and the related outer diameter of the thread (D) a ratio (d:D) of about 0.6 exists.

* * * * *